May 10, 1927.　　J. L. MacVICAR　　1,627,856
AIRCRAFT DESIGN
Filed June 24, 1925　　3 Sheets-Sheet 3

Inventor
J. L. MacVicar

Patented May 10, 1927.

1,627,856

UNITED STATES PATENT OFFICE.

JAMES L. MacVICAR, OF NEWPORT NEWS, VIRGINIA.

AIRCRAFT DESIGN.

Application filed June 24, 1925. Serial No. 39,328.

This invention relates to improvements in the construction, combination and arrangements of the elements comprising an aircraft, of the heavier than air type, consisting of a particularly strong, new and novel frame, made of aluminum alloy, or other suitable material, which will produce great structural strength with minimum of weight.

An object of this invention is to provide means whereby the action of the pulling propellers, and the energy produced in the forward motion will emphasize or enhance the energy produced in the lifting motion, and further, the arrangement of the propellers, being opposed in motion, will develop great gyroscopic energy, contributing to great stability, when aided by rudders under the pilot's control.

One of the prime objects of this invention is to provide means for taking advantage of the action of thrusted or rotated air, delivering forward motion, being centered, or banked by the counter action of thrusted or rotated air delivering upward motion.

Other objects of this invention will appear during the following detailed description, and in the three sheets of drawings which are made a part of this application.

In the drawing—

Similar numerals in the different figures represent the same element.

Figure 1:
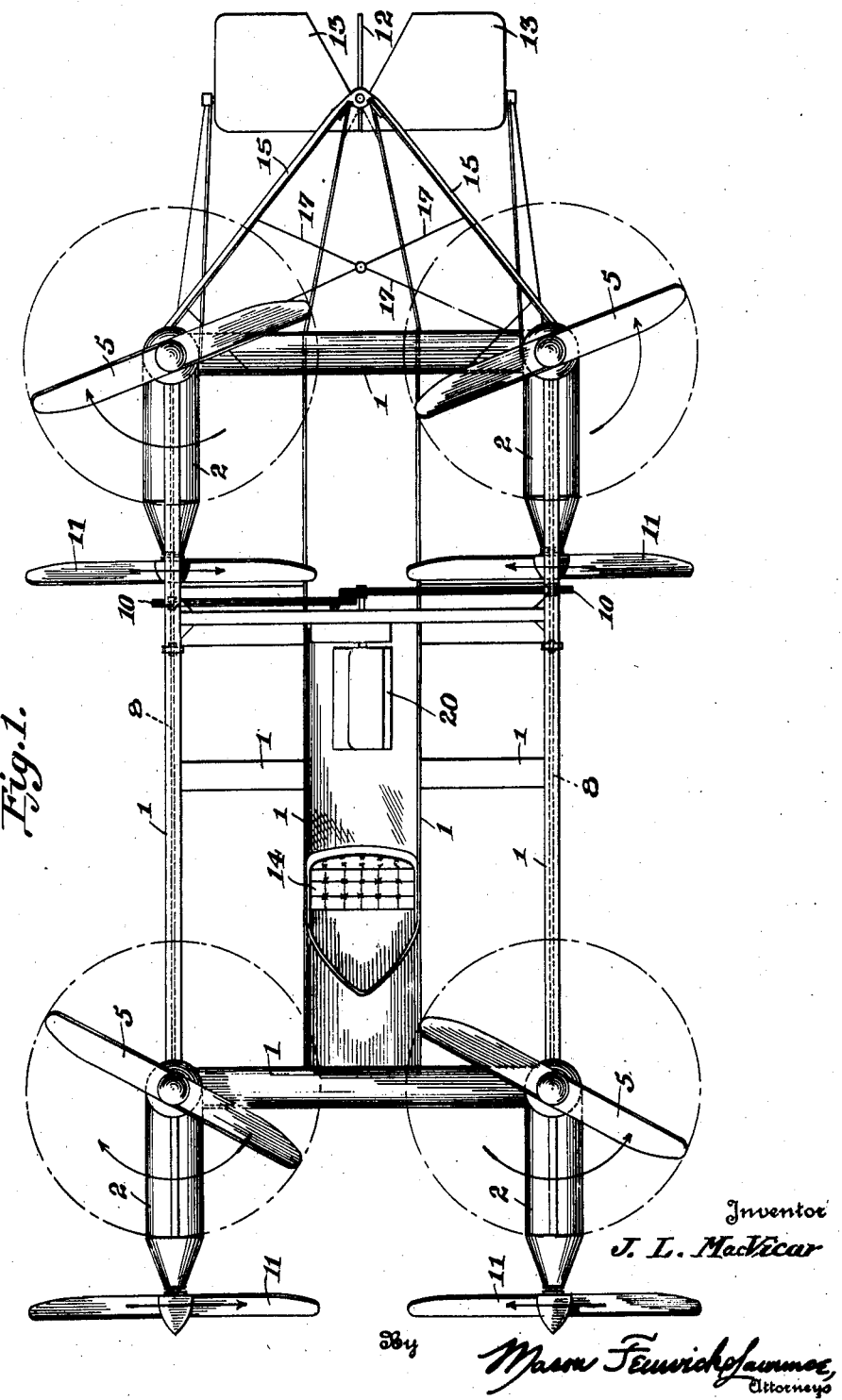
Fig. 1 illustrates a plan view of the air craft.

Numeral 1 designates a suitable frame for the air craft, having novel features of strength in specially designed braces, and supporting pieces adapted to carry all the propellers, motors and mechanism of the aircraft, cylindrical tubes 2 are used for the support and enclosure of shafts 6 and 8 and gears 7, the tubular supports 2 being adapted to both increase the structural strength of the frame 1, and at the same time to reduce air resistance; these cylindrical supports 2 also function to carry the propellers 5 and 11, together with suitable ball thrust bearings. Frame 1 comprises in part several plate brackets as at 3 and 4. These plates have comparatively large surfaces greatly increasing the strength of the frame, and tending to maintain stability for steerage. A plurality of lifting propellers as at 5, are adapted to be located adjacent to the four corners of the frame, or otherwise, the propellers 5 being securely fastened to vertical shafts 6, which are arranged to be driven by gears 7 attached to two horizontal shafts 8, which are driven by the central power plant at 20, through gearing 9 and 10. The horizontal shafts 8 have attached thereto a multiplicity of forward thrust or pulling propellers 11, as clearly disclosed in Figs. 1, 2 and 3. The driving gear for the propellers is preferably arranged so that all adjacent propellers will rotate in the opposite direction. Suitable clutches or similar mechanism is provided for the engagement or disengagement of both lifting or driving propellers to be operated from the pilot station.

In addition to the above, and subject to the pilot control, this construction preferably provides two sets of rudders 12 and 13. Rudder 12 provides means for the control, by the pilot of direction of the air craft and the other set 13 operates for stability. The two rudders may be operated by wire or suitable controls from the pilot's station. Supports 15 for rudder 12 and 13 will be properly braced by means of wires 16 and 17 and turn buckles or other suitable means.

The pilot station 14 is provided between the two lateral structural frames at a point which gives the greatest visibility and stability.

The air craft is further preferably provided with two pairs of chassis 18 and 19 for standing, taking off or landing. In case of water travel suitable floats will be provided.

Figure 2:
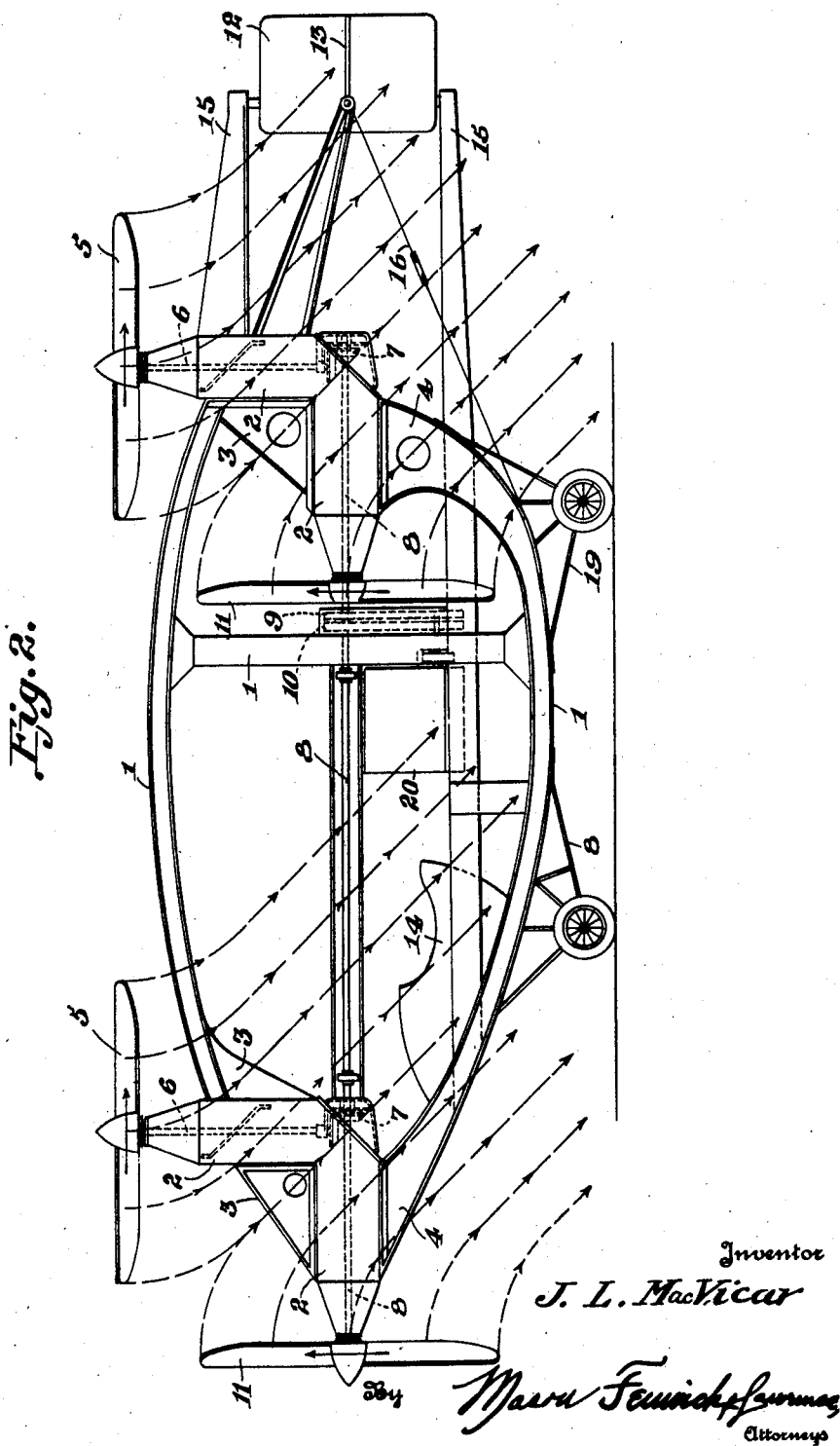
Fig. 2 represents a side elevation view of the air craft showing in diagrammatic form the air stream lines.
Figure 3:
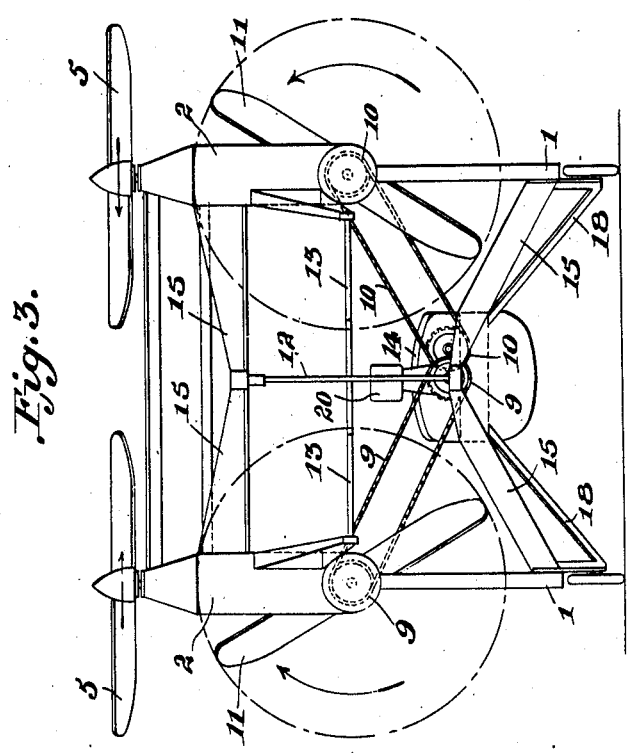
Fig. 3 illustrates an end elevational view of the air craft.

The arrangement of each group of propellers, rotating at the same time and in opposite directions, approximately deflects air stream lines about as indicated by the arrows, as shown in Fig. 2.

The number of groups of propellers may be increased or decreased without sacrifice of the principle claimed by this invention, or the merits thereto, particularly provided the air stream lines remain unimpaired.

The propellers may be provided with two or more blades, and the central motor or motors 20 will be located in a manner to allow for a suitable foundation and flooring between the central lateral frames.

This invention provides an especially strong and well constructed body or frame, the novel features of which provides great structural strength, with a minimum head or air resistance, other than that contributing to the lifting energy.

This invention provides a combination of elements and arrangement of the driving and lifting propellers, regardless of the number employed, resulting in developing an air stream line approximately as disclosed in Fig. 2, whereby the energy resultant from the rapid rotation of the forward thrust or pulling propellers 11, driving the aircraft in a forward movement, which forward movement and air stream line emphasizes the energy delivered by the lifting propellers, when rotated preferably, in the opposite direction. The forward movement of the air craft gives the entering edge of the forward propeller a new body of air to attack, which is thrust back, and at the same time, the lifting propeller rotating in opposed action is pulling upwards, thrusting the discharged air downward, resulting in the downward thrust air being banked on top of the backward thrust air discharged from the forward propeller, which action intensifies the lifting energy of the lifting propellers.

The rudders 12 and 13, as disclosed in Fig. 1, provide means for controlling from the pilot's station the direction of the air craft in its forward motion, also for maintaining the air craft on an even or level keel. This provision is necessary, and suitably provided herein, in order to give the pilot not only control of navigation from one point or place to a distant one, but also to provide against the advent of encountering air pocket or pockets en route.

In this invention any suitable means may be adapted for the transmission of power from the power plant or motor, provided that the action of thrusted or rotated air is brought about, delivering forward motion, being countered or banked by the counter action of thrusted or rotated air delivering upward motion, both actions being necessary for the successful operation of air craft of heavier than air design, other than the lifting plane type of old and common design, which latter principle is in no way involved in this invention.

What I claim is:

1. In an aircraft, a central power plant, driving and lifting propellers, arranged for intensifying the lifting air stream lines delivered by the lifting propellers, and whereby the entering edge of the driving propeller is provided with a new body of air consisting of the forward driving movement, the air to attack being thrust back and at the same time the lifting propeller being rotated upwards thereby thrusting the air stream downward and resulting in the downward thrust air stream being banked on top of the air stream from the driving propellers, resulting in greatly intensifying the lifting power of the lifting propellers, suitable propeller shafts, and frame for carrying the power plant propeller and various aircraft appliances, plate brackets having large surfaces for increasing the strength of the frame, and at the same time tending to maintain stability for steerage means for supporting and enclosing the propeller shaft consisting of cylindrical tubular members, additional means for strengthening the frame consisting of curved or arched member portions connecting with the tubular supports.

2. An aircraft, comprising a pair of vertical stream lined frames, cross members connecting said frames and holding them spaced apart and parallel to each other, driving and lifting propellers at each end of each frame, means for driving said propellers, each driving propeller being rotated in a direction opposite to the direction of rotation of the propeller at the same end of the opposite frame, and each lifting propeller being rotated in a direction opposite to the direction of rotation of the driving propeller adjacent to it on the same frame, the driving and lifting propellers being arranged on the frames sufficiently close to each other to cause the air streams induced by their rotations to impinge on each other and thereby intensify the lifting effect of the propellers, each of said frames including vertical stiffening plates of large surface and extending below the cross members to form stabilizing keels, and landing gear connected to the bottom of each frame.

In testimony whereof I affix my signature.

JAMES L. MacVICAR.